US008364905B2

(12) United States Patent  
Schultz et al.

(10) Patent No.: US 8,364,905 B2
(45) Date of Patent: Jan. 29, 2013

(54) STORAGE SYSTEM WITH MIDDLE-WAY LOGICAL VOLUME

(75) Inventors: Stephen M. Schultz, Houston, TX (US); Chiung-Shang Wu, The Woodlands, TX (US); Rajavel Gnanapragasam, Spring, TX (US); Joseph D. Black, Houston, TX (US); Nhan Q. Vo, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 352 days.

(21) Appl. No.: 12/857,306

(22) Filed: Aug. 16, 2010

(65) Prior Publication Data

US 2012/0042132 A1 Feb. 16, 2012

(51) Int. Cl.
*G06F 12/02* (2006.01)
(52) U.S. Cl. .......... 711/141; 710/52; 711/118; 711/161; 711/162
(58) Field of Classification Search .................... 710/52; 711/118, 141, 161, 162
See application file for complete search history.

(56) References Cited

U.S. PATENT DOCUMENTS

| | | | |
|---|---|---|---|
| 5,761,531 A * | 6/1998 | Ohmura et al. ................. 710/21 |
| 6,467,022 B1 | 10/2002 | Buckland et al. |
| 6,487,638 B2 | 11/2002 | Dawkins et al. |
| 7,069,465 B2 | 6/2006 | Chu et al. |
| 7,143,264 B2 * | 11/2006 | Debes et al. .................. 711/217 |
| 7,272,687 B2 | 9/2007 | Balasubramanian |
| 7,702,852 B2 * | 4/2010 | Kawaguchi et al. .......... 711/114 |
| 2001/0014929 A1 * | 8/2001 | Taroda et al. ..................... 711/4 |
| 2001/0040827 A1 * | 11/2001 | Dosaka et al. ........... 365/189.01 |
| 2002/0156972 A1 * | 10/2002 | McKnight et al. ............ 711/114 |
| 2009/0210620 A1 | 8/2009 | Jibbe et al. |

FOREIGN PATENT DOCUMENTS

JP 2009163647 A 7/2009

* cited by examiner

*Primary Examiner* — Jae Yu

(57) ABSTRACT

A storage system is disclosed including storage devices configured to store data, and a logical storage volume coupled to the storage devices and configured to store a subset of the data as segments. The storage system also includes a controller including a cache and memory. The memory is configured to include records such that each record corresponds with a segment in the logical storage volume and each record includes information regarding data stored in the corresponding segment. The controller is configured to access the records in response to a cache miss of the cache to determine if requested data from the cache miss is stored and ready for access in the logical storage volume. The controller is also configured to update the subset of data stored in the segments as a function of cache misses.

20 Claims, 4 Drawing Sheets

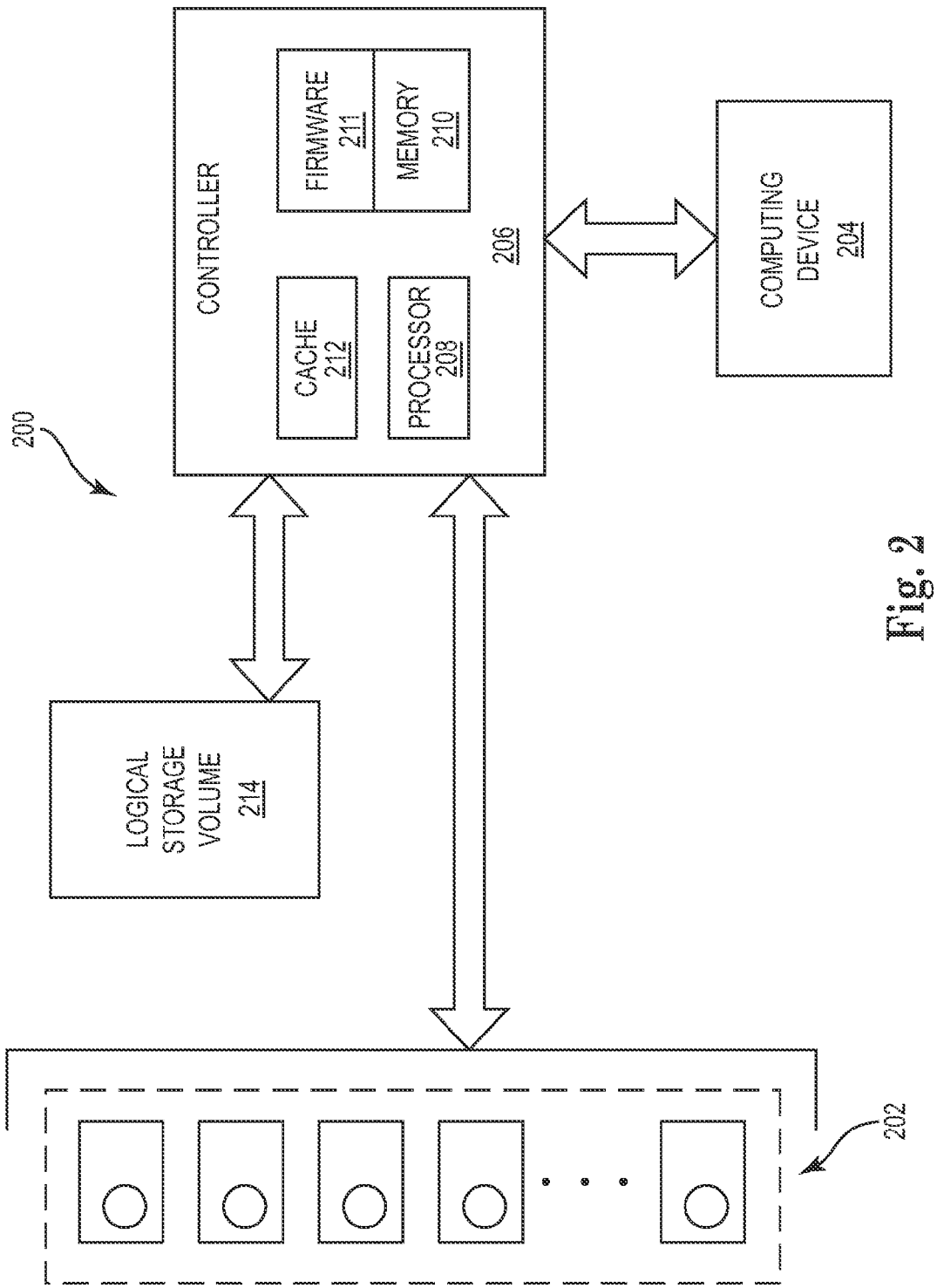

STORAGE SYSTEM WITH MIDDLE-WAY LOGICAL VOLUME

BACKGROUND

A storage array system is a storage system that includes multiple storage devices and advanced functionality. A storage array often includes a storage array controller that manages the storage devices and presents them to a server or computing device as one or more logical storage volumes. Storage arrays often provide data protection far beyond what is achievable with single storage devices. Thus, storage arrays are ubiquitous wherever data protection is concerned.

A widespread standard of configuration of multiple storage devices is RAID ("redundant array of independent disks" or "redundant array of inexpensive disks"). RAID architectures provide high levels of storage reliability from an arrangement of multiple storage devices combined as a single logical storage volume using specialized hardware or software. RAID architectures are generally characterized as providing redundancy through mirroring or parity. If one, or sometimes even two, of the storage devices in many RAID architectures fails, it can be replaced without losing data stored in the array and often without taking the other storage devices offline.

As the acronym suggests, storage array systems have typically included computer or server grade magnetic hard disk drives. Magnetic disks provide high capacity storage devices at a relatively low cost. Other storage devices, such as solid-state media, provide performance benefits such as faster input/output response than magnetic disks and potentially longer life expectancy. Solid-state media is often much more expensive per data unit, i.e. cost per byte, than magnetic media, and the performance gains come with a high price. There is a reluctance to replace the magnetic disks in storage array systems with solid-state media devices.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 2 is a block diagram illustrating an embodiment of a storage array system constructed in accordance with the disclosure including an embodiment of the computing device illustrated in FIG. 1.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
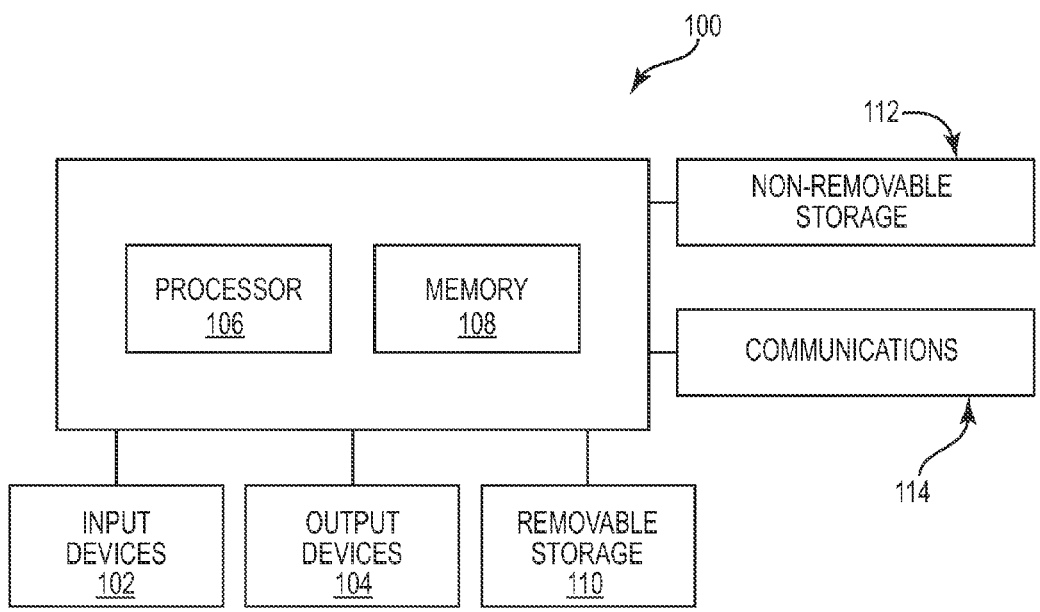
FIG. 1 is a block diagram illustrating an embodiment of a computing device constructed in accordance with the disclosure.

FIG. 1 illustrates an embodiment of a computing device 100. In one example, the computing device 100 can include or can be coupled to one or more input devices 102, such as keyboard, pointing device (e.g., mouse), voice input device, touch input device, or the like. Computing device 100 can also include or can be coupled one or more output devices 104, such as a display, printer, or the like. In a basic configuration, computing device 100 typically includes a processor architecture having at least one processing unit, i.e., processor 106, and memory 108. Depending on the configuration and type of computing device, memory 106 may be volatile, non-volatile, or some combination of the two. The memory 108 can be arranged in a memory hierarchy such as a cache.

Computing device 100 can also include additional data storage including, but not limited to, magnetic or optical disks or solid-state memory, or flash storage devices such as removable storage 110 and non-removable storage 112 for storage of information such as computer readable instructions, data structures, program modules or other data. The computing device 100 can be configured to run an operating system software program that can be stored on the storage media as well as one or more software applications, which make up a system platform. Memory 108, removable storage 110 and non-removable storage 112 are all examples of computer storage media that can be used to store the desired information and that can be accessed by computing device 100. Computing device 100 can also include one or more communication connections 114 that allow the computing device 100 to communicate with a network, such as a large area network or the Internet, on a bus coupling one or more components together, or other suitable connection. In the example shown, the computing device can be configured to access additional storage devices with one or more communication connections.

FIG. 2 illustrates an embodiment of a storage array 200, or storage system configured as components. The storage array 200 includes a plurality of storage devices 202 coupled together in a storage architecture and configured to store data. In one example, the storage devices 202 can be configured in a RAID architecture, such as in one of any number of standard or non-standard levels. In some examples, the storage array 200 can be configured as multiple RAID arrays of the same or different RAID architectures. Further storage array 200 can be configured from multiple storage arrays of the same or various types. In other examples, the storage devices 202 can be configured in a non-RAID architecture or even in a later developed architecture outside the scope of a RAID architecture, and need not necessarily include redundancy. One example is a JBOD (just a bunch of disks) architecture.

The storage array system 200 can be coupled to at least one host computing device 204 having features of the computing device 100 through one or more of the communication connections 114. The computing device 204 can access the data stored in the plurality of storage devices 202 with an input/output operation such as read or write operations. For example, the storage system 200 can deliver data to the computing device 204 in response to a read request from the computing device 204. In one example, multiple computing devices 204 can access the storage array system 200 through a server. In other examples, the computing device 204 directly accesses the storage system 200, i.e., direct access storage, through devices such as PCI (Peripheral Component Interconnect) controllers, backplanes, disk enclosures, and the like.

The storage system 200 also includes a storage array controller 206 that is used to manage the storage devices 202 and the storage architecture as well as to interface with the computing device 204. The storage array controller 206 includes (or at least has part-time access to) a processor 208 and a memory 210. In one example, the memory 210 includes volatile and nonvolatile memory. The storage array controller 206 can include a front-end interface to communicate with the computing device 204, such as over a network or a bus within the computing device 204, and a back-end interface to communicate with the plurality of storage devices 202. In one example, the storage array controller 206 can be implemented as a card having its own firmware, processor 208, and memory 210 coupled to a server or to the bus within the computing device 204.

The storage array controller 206 also include (or at least have access to) a computer readable storage medium tangibly storing computer executable instructions for controlling the storage array controller 206. The computer readable storage medium can include any combination of one or more of hardware, firmware or software. For example, the computer readable storage medium can be included in a section 211 of the memory 210 or in a circuit of the storage array controller 206, and control of the storage array can be affected with the processor 208.

The storage array controller 206 in the example also includes a cache 212, which is often referred to as a controller cache. The cache 212 serves to improve performance of the storage system 200 by transparently storing data from the plurality of storage devices 202 such that future requests for that data can be provided to the computing device 204 faster. The cache 212 can also serve as a buffer to improve the write requests. The data that is stored within a cache 212 can be values that have been computed earlier or duplicates of original values that are otherwise stored in the storage system 200. If requested data is contained in the cache 212, such as in a cache hit, this request can be served by simply reading the cache 212, which is comparably faster than retrieving the data from the plurality of storage devices. Otherwise, this results in a cache miss, and the data has to be recomputed or fetched from a storage location elsewhere on the storage system 200, which can be comparably slower.

Storage system administrators, in developing and maintaining storage systems 200 for an enterprise, attempt to find an economical balance between, reliability, performance, and value. As discussed above, using solid-state media, or other high performance storage media, instead of magnetic disk drives for the plurality of storage devices 202 to improve performance is too often prohibitively expensive. For example, the cost of using solid-state storage devices can be ten times more expensive than a comparable amount of storage capacity in the magnetic disk drives, and this disparity in cost increases with the capacity of the storage system 200. As a result, storage system administrators attempt to improve performance by increasing the amount of controller cache in the storage controller 206, which is significantly less expensive than converting the plurality of storage devices 202 to high performance storage media. Unfortunately, increasing the amount of cache significantly increases the complexity of the system development involved with redesigning the firmware cache model and can significantly increase the risks of a storage system with unintended effects or harmful bugs, which are common problems observed in this approach.

The storage system 200 includes a performance feature that is both significantly less expensive than a conversion to high performance storage media, significantly less complex than adding additional levels of controller cache, and maintains redundancy and security expected in RAID or the selected storage architecture. The storage system 200 includes a middle-way logical storage volume 214 operably coupled to the storage controller 206 and the plurality of storage devices 202. The storage controller 206 is also configured to determine which data or data segments are most frequently missed in cache reads during an event (such as a period of time), an amount of reads, or otherwise) and to store, or copy, these data segments into the logical storage volume 214. Upon a subsequent cache miss, for example, the storage controller 206 can access the logical storage volume 214 storing commonly requested data for fast reads rather than accessing the plurality of storage device 202. The data or data segments in the logical storage volume can be overwritten with new data as the storage controller 206 updates the determination of most frequently missed cache reads. The logical storage volume 214 can be configured as a dedicated storage volume, and can include its own redundancy. In one example, the logical storage volume can be configured in RAID 0, or the like, to maintain its high speed of access. In the example shown, the logical storage volume 214 is configured from a single storage device, but the logical storage volume 214 can also be configured from more than one storage device.

In one example, the logical storage volume 214 is a higher performance storage device such as one that will include better performance on selected features than the storage devices 202 in the array. Examples of a selected feature can include speed, input/output performance, or the like. An example of a higher performance storage device can be a solid-state storage device in the case were the plurality of storage devices 202 in the array are magnetic disk hard drives. This configuration provides significant benefits in that it deploys fast random read accesses with relatively low additional costs and requires relatively minimum changes to cache architecture code in comparison to adding additional cache.

Other configurations of the types of storage devices 202 used in the storage system 200 are possible. Configurations including different combinations of storage media between the storage devices 202 and the storage volume 214 are contemplated. Also, similar storage media can be used in the storage devices 202 and the storage volume 214. In one example, the logical storage volume 214 is similar to the plurality of storage devices 202 in the array but includes higher performance specifications than the plurality of storage devices 202. Further, examples are contemplated where the logical storage volume 214 does not include performance benefits over the plurality of storage drives 202 in the array.

Figure 3:
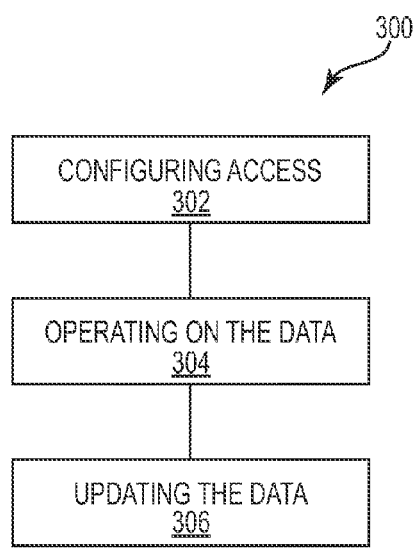
FIG. 3 is a block diagram illustrating an embodiment of a method constructed in accordance with the disclosure for use with the embodiment of the storage array system illustrated in FIG. 2.

FIG. 3 illustrates an embodiment of a method 300 for use with the storage system 200. The method 300 includes features of configuring access to data in the logical storage volume at 302, operating on the data in the logical storage volume at 304, and updating the data in the logical storage volume at 306. For example, the feature of configuring access to the data in the logical storage volume 302 will allow the computing device 204 to transparently access the logical storage volume 214 for faster data transfers than if it accessed the storage devices 204 of the array. The feature of operating on the data in the logical storage volume at 304 allows the computing device 204 to read data from the logical storage volume 214 or the storage devices 202 of the array, and includes how data in the logical storage volume is affected when the computing device 204 overwrites the data stored in the logical storage volume 214. The feature of updating the data in the logical storage volume at 306 determines which data or data segments are most frequently missed in cache reads. The features 302, 304, 306 of the method 300 are shown in a particular order for example only, and they can be performed in any order and at times skipping features or repeating features before all of the features are performed. In practice, the features or at least some of the features can be performed or configured during runtime.

Figure 4:
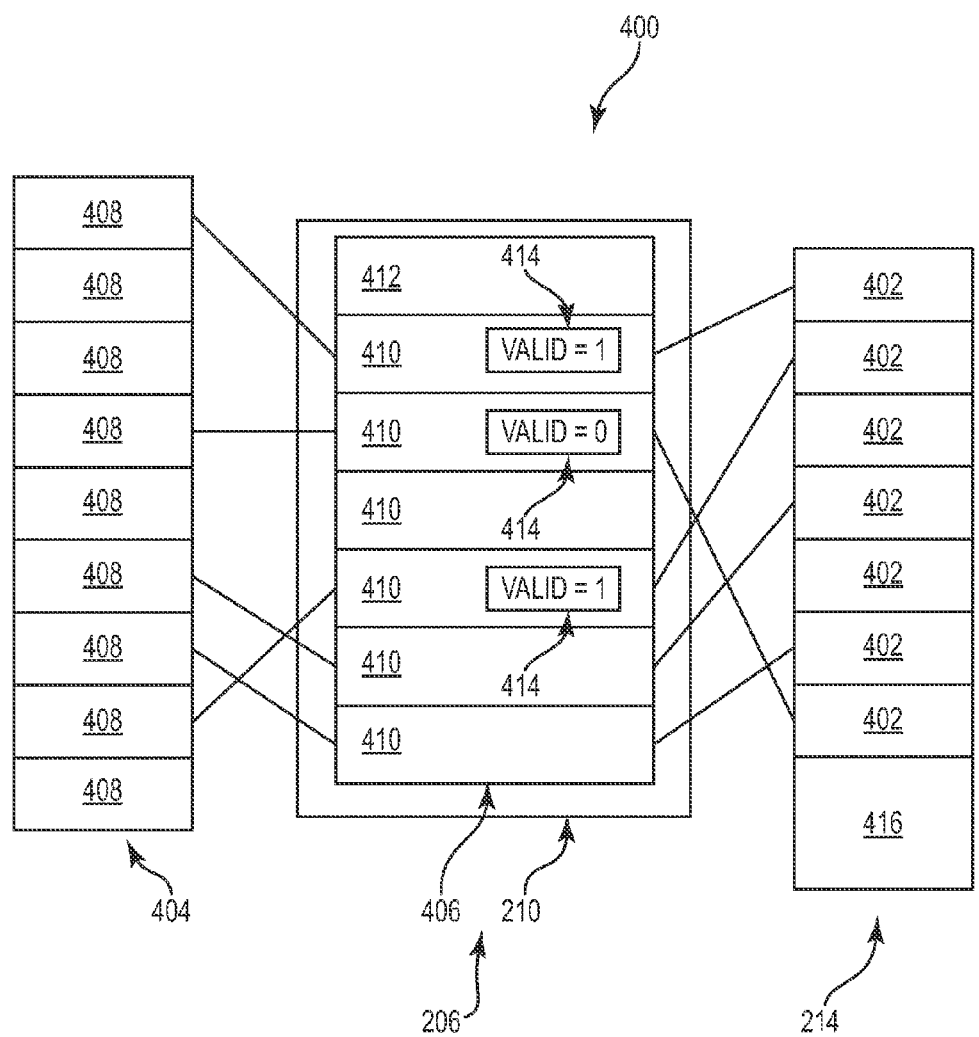
FIG. 4 is a block diagram illustrating an embodiment of a subsystem for use with the storage array system of FIG. 2 and used in the embodiment of the method illustrated in FIG. 3.

FIG. 4 illustrates an embodiment of a subsystem 400 implementing the feature of configuring access to data in the logical storage volume at 302 of FIG. 3. Subsystem 400 corresponds with storage system 200 of FIG. 2. The logical storage volume 214 is configured to include a plurality of data segments 402. The subsystem also includes an array 404, which corresponds to the example plurality of storage devices 202 of FIG. 2. The array 404 illustrates the data in the plurality of storage devices 202 as arranged in a plurality of data units 408 in a storage volume. At least a portion of memory 210 in controller 206 is configured to include a mapping table 406 having a plurality of records 410 and, in some examples, a header 412. Each of the plurality of records can store information 414 about a corresponding data segment 402 and also relates to a corresponding data unit 408 in the array 404.

The logical storage volume 214 includes a portion that is partitioned into a plurality of data segments 402 of a selected size, which are configured to duplicate at least a subset of the data stored in the storage devices 202 of the array 404, such as a RAID array. In one example, the size of the data segment 402 can be equal to integer multiples of one or greater of the strip size (or, stripe unit) of data units 408 of array 404. In the case of an array having different sizes of strips, or from multiple arrays having different sized strips, the data segment size can be integer multiples of one or greater of the least common multiple of the strips. The data that is stored within each of the data segments 402 can be duplicates of original values that are otherwise stored in the array 404. Further, the data within each of the data segments 402 can be overwritten or replaced with new data.

Mapping table 406 is configured to describe how the subset of data in the plurality of data segments 402 relates to the data in the array 404. The mapping table 406 can be a data structure created in the controller memory 210, such as in the volatile memory of the storage array controller 206, and is configured to include the plurality of records 410. In one example, each of the records 410 corresponds with one of the data segments 402, and each data segment 402 includes a unique record 410 associated with it. The mapping table 406 can include the header 412 that includes information 414 about the table 406 itself, and each of the records 410 include information about the data in the corresponding data segments 402. When the data in the data segments 402 is updated or replaced, the information 414 in the record 410 corresponding to the data segment 402 can be replaced or updated too. In one example, the logical storage volume 214 can include storage portions in addition to data segments 402 such as a configure area 416 that may use a small amount of the storage to include configuration data and a copy of the mapping table 406 for redundancy and to recover the mapping table 406 in the storage controller 206 in the case of power loss, reboot, or other reasons.

In one example, the table header 412 defines broad scale characteristics of the mapping table 406. For example, the table header can include an access flag or a disable flag to indicate whether records 410 are available for search, size of segment indicator corresponding with the size of each data segment 402, a table start which can indicate the last time the table was updated, and so on. In cases where the number of segments 402 in the logical storage volume 214 is very large, the overhead used to search for information within the records can be expensive. In these situations, the mapping table 406 can be split into many smaller tables that can each include a header that applies to the records within the smaller table that can be searched separately. Other configurations of the mapping table 406 and table header 412 are possible.

Each record 410 includes information 414 about the data in its corresponding data segment 402. This information 414 can be stored in a plurality of fields within the record 410. In one example, the information 414 can include at least an indicator, such as a valid flag, as to whether the data in the corresponding data segment is empty, invalid, or valid. For example, a data segment 402 can be considered valid if the data corresponds with the original data also stored in the array 404, and the data can be considered invalid if the data has been updated with a write operation since it was stored in the data segment 402, or for other reasons. In one example, the records 410 can each include field for an index to the address of their corresponding data segments 404 in the logical storage volume 214, as well as an index to the address of the corresponding data in the RAID array 404. One field can include a ready for read indicator. The records 410 can also include a set of counters such as a counter of missed cache reads and a counter of how often the corresponding data segment 402 is invalid. Further the records can include a time stamp of the first missed cache read of this record, a time stamp of the last missed cache read, and counter for each of the misses. Other fields can be included in the record 410.

The feature of operating on the data in the logical storage volume at 304 of FIG. 3 generally includes read cache misses and write operations to the array 404. If the computing device 204 makes the read request, and the result is a cache miss, the controller will check the table 406 to see if the requested data is in the logical storage volume 214. If the requested data is in the logical storage volume 214, the corresponding record 410 will indicate with its flags and fields whether the data is ready for read. If the data is ready for read, the data will be read from the corresponding data segment 402. If a record 410 is not included in the mapping table 406, or if the record indicates that the data is not ready for read, the requested data will be read from the storage array as a regular read operation. These steps can be repeated if the requested data is larger than the size of the data segments 402. The record 410 is updated by making appropriate changes to its fields.

In one example, write operations are performed to the array 404 rather than to the logical storage volume 214. In the case of a write operation, however, the table 406 can still be searched to determine if the address of the write corresponds with an address of data copied into the logical storage volume 214. If so, then the data written in the array 404 would likely not correspond with the data copied into the data segment 402. Accordingly, the record 410 is updated by invalidating the data so it will no longer be read and by making appropriate changes to the other fields.

The feature of updating the data in the logical storage volume at 306 of FIG. 3 can include storing new data in the logical storage volume 214 and/or creating a new record 410 corresponding with the data. This feature can be implemented in many ways. A few examples of these ways are discussed below and these examples involve at least one of updating the logical storage volume with data from the most recent missed cache read or the most frequently missed cache read during an event. An example of an event can include the passage of time, such as most missed cache reads in the last 15 seconds. Another example of an event could include a threshold number of missed cache reads or other operations.

In view of the above, an example of configuring access to data at 302 includes copying data from the storage array 404 into the data segments 402 in the logical storage volume 214 and storing information 414 regarding the data copied into the data segments 402 in the records 410, where each data segment 402 corresponds with a separate record 410. An example of operating on the data at 304 includes searching the records 410 for information 414 regarding data requested in a missed cache read. An example of updating the data at 306 includes updating the data in the logical storage volume 214 based on a function of missed cache reads.

Figure 5:
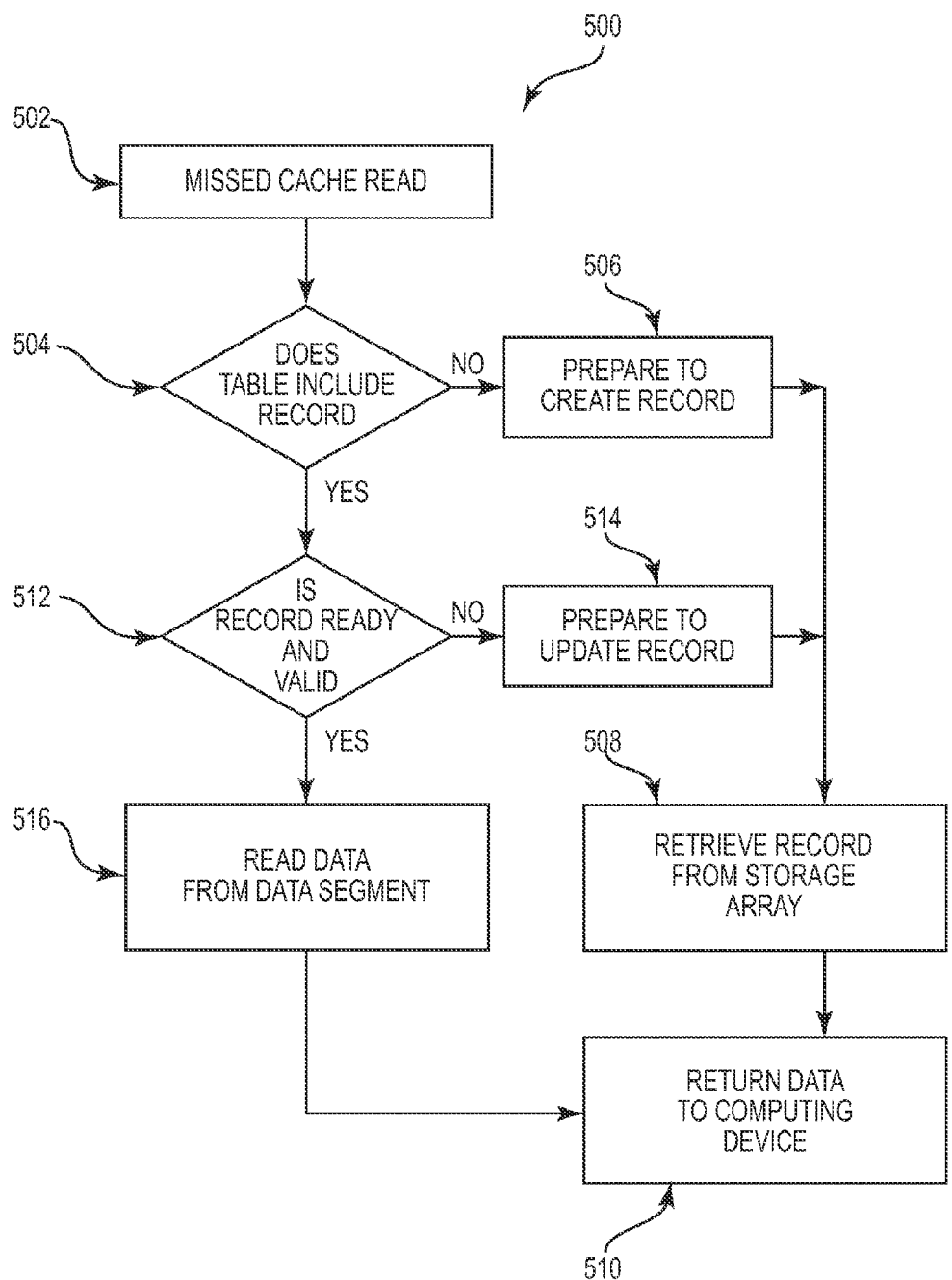
FIG. 5 is a flow chart illustrating an embodiment of a method that can be used in the embodiment of the method illustrated in FIG. 3.

FIG. 5 illustrates a method 500 that can be used with several examples of returning data and updating a record. After a missed cache read, at 502, the mapping table 406 is queried to determine if it includes a record 410 corresponding with the requested data at 504. If there is no record 410 corresponding with the requested data, or the table is not available or the like, the method can create or prepare to create a new record 410 in the mapping table 406 and also data segment 402 to include the requested data in the logical storage volume at 506. Additionally, the requested data is read from the array 402 at 508, and it is returned to the controller 206 and ultimately to the computing device 204 at 510.

If there is a record 410 corresponding with the requested data at 504, the method proceed to query the record 410 to determine whether the data in the data segment 402 is ready and valid at 512 in the logical storage volume 214. If the record 410 indicates that the corresponding data in the logical storage volume 214 is not ready or valid at 512, the method can update or prepare to update the record 410 in the mapping table 406 and also the data segment 402 to include the requested data in the logical storage volume at 514. Additionally, the requested data is read from the array 402 at 508, and it is returned to the controller 206 and ultimately to the computing device 204 at 510 as before.

If the record 410 corresponding with the requested data indicates the data in the data segment 402 is valid and ready at 512, the requested data is read from the data segment 402 at 516, and it is returned to the controller 206 and ultimately to the computing device 204 at 510. After each missed cache read, the appropriate fields and flags in the records 410 are also modified or updated (not shown).

The method 500 can apply to one or more of several algorithms to determine when to create or update records. In one basic example algorithm, data read from the array 404 can be included in a data segment 402, and a corresponding record 410 in the table 406 can be created or updated, after each missed cache read. If the logical storage volume 214 includes empty data segments 402, the data can be stored in an empty data segment 402. If the logical storage volume 214 does not include any empty data segments 402, the data can overwrite existing data no longer valid or necessary (such as a data segment 402 that includes data that has not been read for a threshold amount, e.g., the least frequently access data segment 402). Many other examples of creating or updating records 410 and data segments 402 to include the most frequently missed cache data are contemplated, and include determining with counters which data is requested after a missed cache read in the last selected amount of time or within the last selected amounts of missed cache reads, or the like.

In one particular example, the algorithm can use optimizing factors and optimizing values to determine the most frequently missed cache reads. For example, the algorithm can be based on such information as the frequency that is calculated from the time of the last occurrence of the missed cache read to the present time, and can be referred to as current frequency missed cache data (CFD). In one example, CFD can be determined by $1/\Delta T$, where the $\Delta T$ refers to the amount of time between the last missed cache read for this data to the current time. The higher value for CFD can indicate the more critical data being missed. Other information used in the algorithm can include the average frequency that is calculated from the first time of a missed cache read and the last time of the missed cache read, and can be referred to as average frequency missed cache data (AFD). In one example, AFD can be determined as $MRC/\Delta T_0$, where MRC is the number of missed cache reads and $\Delta T_0$ is the amount of time between the first missed cache read and the last missed cache read. In cases with only one missed cache read, AFD=CFD. The information regarding times and number of missed cache reads can be stored in and accessed from the fields of the records 410.

In one example, an optimizing value OV can be determined with the algorithm:

$$OV = A_0(\beta * CFD + AFD - \alpha * AFD)$$

Where $A_0$ is constant to adjust the weight of the OV and can be 1; $\beta$ is an accelerate factor and generally is not greater than 0.5; and $\alpha$ is the decrease factor that can be a function of the segment size, the transfer rate of the data read, the transfer rate of the data write, seek time for read, seek time for write, latency time for read, latency time for write, and so on, but is generally not less than 1 because the times for writes are generally greater than times for reads for the logical storage volume 214. In practice, $\beta$ and $\alpha$ can be determined by measuring features of the storage system 200. The higher the OV, the more likely the data from the array 404 should be included in a data segment 402 of the logical storage volume 214.

The OV can be used to determine which records can be created or updated in the mapping table 406 and its corresponding data included or updated in a data segment 410, and which records can be deleted from the mapping table. In general, the records and corresponding data with the higher or highest OVs can replace the lower or lowest OVs. In the case where the record 410 already exists in the mapping table 406, the records 410 with the higher or highest OVs can update and validate the record already existing in the mapping table 406.

Other strategies or more particular strategies are contemplated. In one example, an average for all OVs in the records 410 in the table can be calculated and all records with OVs less than a percentage of the average OV can be discarded or removed from the table, and all new or updated records with OVs greater than another percentage can be created or updated in the table 406. In general, calculating OVs for each record, and an average OV and a percentage of the average OV for the table 406 (or sub-table) can be expensive in terms of system resources, and thus calculations with less overhead can be use. In one example, a predetermined threshold low value can be determined, and all records with OVs less than the predetermined low threshold value can be replaced or deleted from the table 406. Similarly, a predetermined high threshold value can be determined, and all records with OVs greater than the predetermined high threshold value can be created or updated in the table 406.

Methods 300 and 500 can be implemented in the above-described computer storage medium within the storage array controller 206, can be included as part of an operating system, a plug-in, or application, or as some form of computerized method.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A storage system, comprising
   a plurality of storage devices coupled together and configured to store data,
   a logical storage volume operably coupled to the plurality of storage devices and configured to store a copy of a subset of the data as a plurality of segments; and
   a controller including a cache and memory, wherein the memory is configured to include a plurality of records such that each record corresponds with a segment in the logical storage volume and each record includes information regarding data stored in the corresponding segment;
   wherein the controller is configured to access the records in response to a cache miss of the cache to determine if requested data from the cache miss is stored and ready for access in the logical storage volume; and
   wherein the controller is configured to update the subset of data stored in the plurality of segments as a function of cache misses.

2. The storage system of claim 1 wherein the plurality of storage device are coupled together in a RAID architecture.

3. The storage system of claim 2 wherein the storage devices include a plurality of magnetic hard disk drives.

4. The storage system of claim 3 wherein the logical storage volume includes at least one solid-state storage device.

5. The storage system of claim 1 configured to be coupled to a computing device having a bus, wherein the controller is included on a card coupled to the bus.

6. The storage system of claim 1 wherein the memory configured to include the plurality of records is a volatile memory.

7. The storage system of claim 1 wherein the information included in each record includes a valid flag.

8. The storage system of claim 1 wherein the controller is configured to access the plurality of storage device if the records indicate the requested data from the read cache miss is not stored in the logical storage volume or not ready for access in the logical storage volume.

9. The storage system of claim 1 wherein the controller is configured to update the subset of data stored in the plurality of segments as a function of a frequency of the read cache misses.

10. A non-transitory computer readable storage medium storing computer executable instructions for controlling a computing device to perform a method comprising:
    copying data from a storage array into a plurality of data segments in a logical storage volume;
    storing information regarding the data copied into the data segments in a plurality of records, wherein each data segment corresponds with a separate record;
    searching the records for information regarding data requested in a missed cache read; and
    updating the data in the logical storage volume based on a function of missed cache reads.

11. The computer readable storage medium of claim 10 wherein the copying of data from the storage array includes copying a subset of the data from the storage array into the plurality of data segments in the logical storage volume.

12. The computer readable storage medium of claim 10 wherein each data segment is an integer multiple of one or more of a strip size of the storage array.

13. The computer readable storage medium of claim 10 and further comprising creating a in a memory of the computing device, wherein the plurality of records are included in a data structure.

14. The computer readable storage medium of claim 10 wherein the information regarding data includes an indication whether the data is available in the logical storage volume.

15. The computer readable storage medium of claim 14 and further comprising accessing the data requested in the missed cache read from the logical storage volume if the indication is the data is available in the logical storage volume.

16. The computer readable storage medium of claim 15 and further comprising accessing the data requested in the missed cache read from the storage array if the indication is the data is not available in the logical storage volume.

17. The computer readable storage medium of claim 10 wherein the updating includes overwriting data in the data segments and updating corresponding records.

18. A method for use with a storage system including a storage array containing data, a logical storage volume containing a copy of a subset of the data as a plurality of data segments, and a processor coupled to a memory, the method comprising:
    in response to a missed cache read, using the processor to query a table of records in the memory, wherein each record corresponds with a separate data segment, to determine if data requested in the missed cache read is included in the plurality of data segments;
    if there is no record corresponding to the data requested in the missed cache read, using the process to prepare to create a record corresponding to the data requested in the missed cache read and using the processor to retrieve the data requested in the missed cache read from the storage array;
    if there is a record corresponding to the data requested in the missed cache read but the record indicates the corresponding data is not available, using the processor to prepare to create update the corresponding record and using the processor to retrieve the data requested in the missed cache read from the storage array; and
    if there is a record corresponding to the data requested in the missed cache read and the record indicates the corresponding data is available, using the processor to retrieve the data requested in the missed cache read from the logical storage volume; and the storage array.

19. The method of claim 18 wherein each record maps the data in the storage array to the data segment in the logical storage volume, and further comprising using the processor to update a record to indicate the corresponding data in the logical storage volume is unavailable if the data mapped in the storage array has been written to.

20. The method of claim 18 and further comprising updating the data in the logical storage volume based on a function of missed cache reads.

* * * * *

UNITED STATES PATENT AND TRADEMARK OFFICE
CERTIFICATE OF CORRECTION

| | | |
|---|---|---|
| PATENT NO. | : 8,364,905 B2 | Page 1 of 1 |
| APPLICATION NO. | : 12/857306 | |
| DATED | : January 29, 2013 | |
| INVENTOR(S) | : Stephen M. Schultz et al. | |

It is certified that error appears in the above-identified patent and that said Letters Patent is hereby corrected as shown below:

In the Claims:
In column 10, line 12, in Claim 13, after "creating a" delete "in a".

Signed and Sealed this
Seventh Day of May, 2013

Teresa Stanek Rea
*Acting Director of the United States Patent and Trademark Office*